United States Patent [19]

Smith

[11] Patent Number: 5,294,222

[45] Date of Patent: Mar. 15, 1994

[54] METHOD OF PREVENTING DAMAGE TO PIPE JOINTS DURING SHIPMENT

[75] Inventor: H. Bill Smith, Dallas, Tex.

[73] Assignee: Mobil Oil Corporation, Fairfax, Va.

[21] Appl. No.: 849,789

[22] Filed: Mar. 10, 1992

[51] Int. Cl.5 ............................................ B60D 7/00
[52] U.S. Cl. ................................. 410/36; 410/42; 410/97; 410/117; 206/443
[58] Field of Search .................. 410/31, 32, 35, 36, 410/37, 38, 39, 40, 41, 42, 87, 155, 156, 96, 97, 117, 120; 206/443, 446, 3

[56] References Cited

U.S. PATENT DOCUMENTS

| | | | |
|---|---|---|---|
| 2,300,059 | 10/1942 | Perry | 410/36 |
| 2,471,209 | 5/1949 | Gazdik | 206/443 |
| 2,933,866 | 4/1960 | Cranston | 206/443 |
| 3,021,970 | 2/1962 | Bigge et al. | 410/37 |
| 3,220,583 | 11/1965 | Robertson | 206/443 |
| 3,237,786 | 3/1966 | Milliken | 410/35 |
| 3,237,796 | 3/1966 | Callahan | 206/443 |
| 3,263,830 | 8/1966 | Anderson | 206/443 |
| 3,373,540 | 3/1968 | Wisner | 206/443 |
| 3,894,495 | 7/1975 | Dare et al. | 410/36 |

FOREIGN PATENT DOCUMENTS

| | | | |
|---|---|---|---|
| 2208139 | 8/1973 | Fed. Rep. of Germany | 206/443 |
| 2023513 | 1/1980 | United Kingdom | 410/36 |

Primary Examiner—Mark T. Le
Attorney, Agent, or Firm—Alexander J. McKillop; George W. Hager, Jr.

[57] ABSTRACT

A method is provided for protecting pipe joints during shipment. Each individual pipe joint to be stacked in the hold of a ship for transport has several rope rings assembled therearound. Rope rings are assembled around the pipe joints during or just prior to the loading operation, using flexible plastic locking strips to secure the ends of lengths of multiple-stranded hemp rope together forming protective rings.

22 Claims, 2 Drawing Sheets

METHOD OF PREVENTING DAMAGE TO PIPE JOINTS DURING SHIPMENT

BACKGROUND OF THE INVENTION

1. Field of the Invention

This invention relates to a method for prevention of damage to lengths of pipe during shipment. More particularly, the invention is directed to methods of prevention of damage to steel pipe joints used for well completion during ocean shipment from a source, typically a port serving a steel mill, to a destination such as a port serving an offshore oil platform.

2. Description of the Prior Art

Oil and gas wells drilled in the earth are commonly completed by placement of a tubular "casing" in the well. The casing comprises a continuous assembly of steel pipe sections, referred to hereinafter as "pipe joints". The pipe joints are typically externally threaded at both ends in order to be joined by internally threaded pipe couplings to form a continuous casing through which oil and gas are brought to the surface from a formation in the earth. Commonly the casing is surrounded by a layer of cement serving to consolidate the formation around the casing and preventing collapse of the formation as oil and gas are produced.

Successful production of oil and gas from a cased well requires that the casing retain its integrity, that is, that the casing does not corrode to the point of leakage, crack, or fracture during the period of production of the well, which may be several decades. One significant failure mechanism of well casings involves corrosion due to the presence of hydrogen sulfide, $H_2S$. Hydrogen sulfide is found in many formations. Additionally, certain commonly used "drilling muds" employed to lubricate the drill bit and flush cuttings away from the face of the drill bit contain materials which release hydrogen sulfide over time, so that to the extent some of the drilling mud remains in the well it may function as a source of corrosive agents.

To combat corrosion of well casings caused by hydrogen sulfide, whether native in the reservoir itself or introduced as part of the drilling or completion processes, pipe joints manufactured of relatively soft steels such as steels of grades known to the art as L-80 and C-95 are typically employed. These relatively soft steels are corroded relatively less upon exposure to $H_2S$ than are harder steels that might otherwise be suitable as well casings.

The art is well aware that hardening of such soft steels markedly increases their susceptibility to corrosion, particularly in the presence of $H_2S$. Such steels experience substantial work hardening responsive to relatively minimal surface impacts. For example, it was found in one test carried out by the assignee of the present application that simply dropping a single pipe joint from the height of approximately 4½ feet onto a concrete surface caused sufficient work hardening to render the pipe joint unsatisfactory for service. Therefore, such pipe joints must be protected from impact damage to the maximum degree possible.

Most wells are completed using pipe joints manufactured at steel mills remote from the producing field. Wells in Nigeria, for example, or the North Sea are commonly completed using pipe joints manufactured in Japan or the United States. The pipe joints are shipped by sea from the mills to the wells as needed. Extended ocean voyages are thus involved, often through regions experiencing violent weather, such as the North Atlantic Ocean.

Pipe joints are normally stacked in longitudinal rows in the hold of a ship for shipment. If the pipe joints were simply piled loosely in the hold of the ship, they would roll laterally during normal weather conditions, and violently so during storms. Such unrestrained lateral rolling would allow the pipe joints to impact one another, and would lead rapidly to work hardening of the pipe joints. The art is well aware of the need to provide the maximum possible protection of pipe joints from damage during shipment. Accordingly, the art has sought both to minimize such rolling of the pipe joints during shipment (although it is impractical to provide each pipe joint with a secure individual mounting for shipment) and to reduce damage caused when adjacent pipe joints impact one another.

More particularly, the art has developed practices for minimizing movement of pipe joints during a voyage, and teaches placing circular impact-absorbing bumper members around each individual pipe joint at several locations therealong, to prevent the pipe joints from directly impacting one another in the event some rolling does take place. However, the bumper members taught by the prior art are not wholly satisfactory.

More specifically, molded plastic circular ring bumpers are in common use for preventing contact between pipe joints during shipment. One type of such molded plastic ring bumper is sold under the tradename "Protek". Typically such molded plastic ring bumpers include two "C"-shaped halves pivoted to one another by a riveted pivot pin. A removable pin passing through mating bores in the two halves of the ring bumper opposite the riveted pivot pin secures the two halves together. In order to assemble the ring bumper over a pipe joint, the removable pin is removed and the two halves of the ring bumper are pivoted about the riveted pivot pin, opening the ring. The ring bumper is placed over the pipe joint, reclosed, and the removable pin is inserted in the mating bores, to secure the ring bumper over the pipe joint.

Three such molded plastic ring bumpers are typically placed over each pipe joint prior to loading. Use of the molded plastic ring bumpers provides a modicum of impact absorption should adjacent pipe joints impact one another during shipment. However, such ring bumpers are formed of a relatively heavy, dense, hard plastic material. This material is susceptible to being cracked, fractured or in some cases even shattered when subject to heavy impact loads as may be experienced due to shifting of the pipe joints during rolling of a transport ship experiencing bad weather conditions. Commonly, such molded plastic bumper rings are so badly battered after a single voyage that a large percentage cannot be reused; accordingly the bumper rings are typically discarded after a single voyage, at substantial cost. In some cases, such bumper rings are so badly damaged after a single voyage that they do not remain assembled over the corresponding pipe joint, but simply fall off the pipe joint in fragments. If fragments of the molded plastic bumper rings fall upon stevedores or other workers while the pipe joints are being lifted by a crane during off-loading, serious injury can result, especially given the very dense nature of the plastic used to make the bumper rings.

Use of molded plastic bumper rings to protect pipe joints during shipment also requires that appropriate numbers and sizes of the bumper rings be on hand at the shipping location on the shipment date; if there is any error in the placement or fulfillment of a particular order of such rings corresponding to the pipe joints to be shipped in a particular shipment, any delay in delivery of the order, or any change in the numbers of different sizes of pipe joints to be shipped, the shipment of pipe joints may be significantly delayed. Delay in shipment of the pipe joints can cause delay in well completion, occasioning very significant inconvenience and expense.

Certain of the steel mills producing pipe joints for the oil well completion industry have provided pipe joints encircled with spiral members formed of rubber tubing, referred to as "pigtails". These rubber pigtails provide a modicum of protection against damage caused by impacting of the pipe joints against one another. However, it has been found that the impact loads experienced by pipe joints during ocean voyages are frequently sufficient to pinch and cut the pigtails, such that the pigtails do not prevent the pipe joints from contacting one another and becoming work hardened during oceanic shipment.

Therefore, it is apparent that there exists a need in the art for a method of shipment of pipe joints minimizing impact damage to pipe joints during oceanic shipment. More particularly, the art requires a simple, low cost ring bumper and method of applying the same to pipe joints for protecting the pipe joints from impacting one another during shipment. Additionally, it will be apparent that a need exists in the art for a suitable bumper member for protecting pipe joints from one another during shipment that is not rendered useless after a single voyage, so that it can be economically reused.

OBJECTS AND SUMMARY OF THE INVENTION

It is therefore an object of the invention to provide a method for shipment of pipe joints that will prevent damage to the pipe joints during shipment, and specifically to provide an improved method for preventing pipe joints from contacting one another during shipment that can be accomplished simply and economically, using readily available materials.

It is a further object of the invention to provide a method of loading the hold of a ship with pipe joints for oceanic shipment, including a method of assembling protective rings over each pipe joint during loading, that does not require particular components to be available at the time of shipment.

These and other objects of the invention which will appear as the discussion below proceeds are satisfied by the present invention, whereby a number of rings fabricated of hemp rope are assembled about each pipe joint to be shipped during or immediately preceding the ship loading process. Preferably the rope rings are fabricated over the pipe joints. Rope is cut into lengths sufficient to form a ring extending about the pipe joints with several inches overlap of the cut ends. The cut ends are bound to prevent fraying and the bound ends are then secured to one another around the pipe joint to complete the rope ring.

It has been found by the inventor that such rope rings are more effective in preventing damage to pipe joints during shipment than are the molded plastic bumper rings discussed above. Rope rings fabricated according to the method of the invention are more durable in service than molded plastic rings or the like, such that the rope rings can be reused where appropriate, and do not present any danger of injury to workers as had the prior art molded plastic rings. Rope suitable to form such rope rings is readily available at dockyards, so that there is no necessity of supply of an appropriate number of molded plastic rings or the equivalent in proper sizes before a shipment can be loaded. Suitable lengths of rope may be formed into rope protecting rings according to the invention using commonly available flexible plastic locking strips. Similar locking strips may be used to bind the cut ends of each length of rope prior to the ends being secured to one another around the pipe joint to form rope rings.

BRIEF DESCRIPTION OF THE DRAWINGS

The invention will be better understood if reference is made to the accompanying drawings, in which.

DESCRIPTION OF THE PREFERRED EMBODIMENTS

Figure 1:
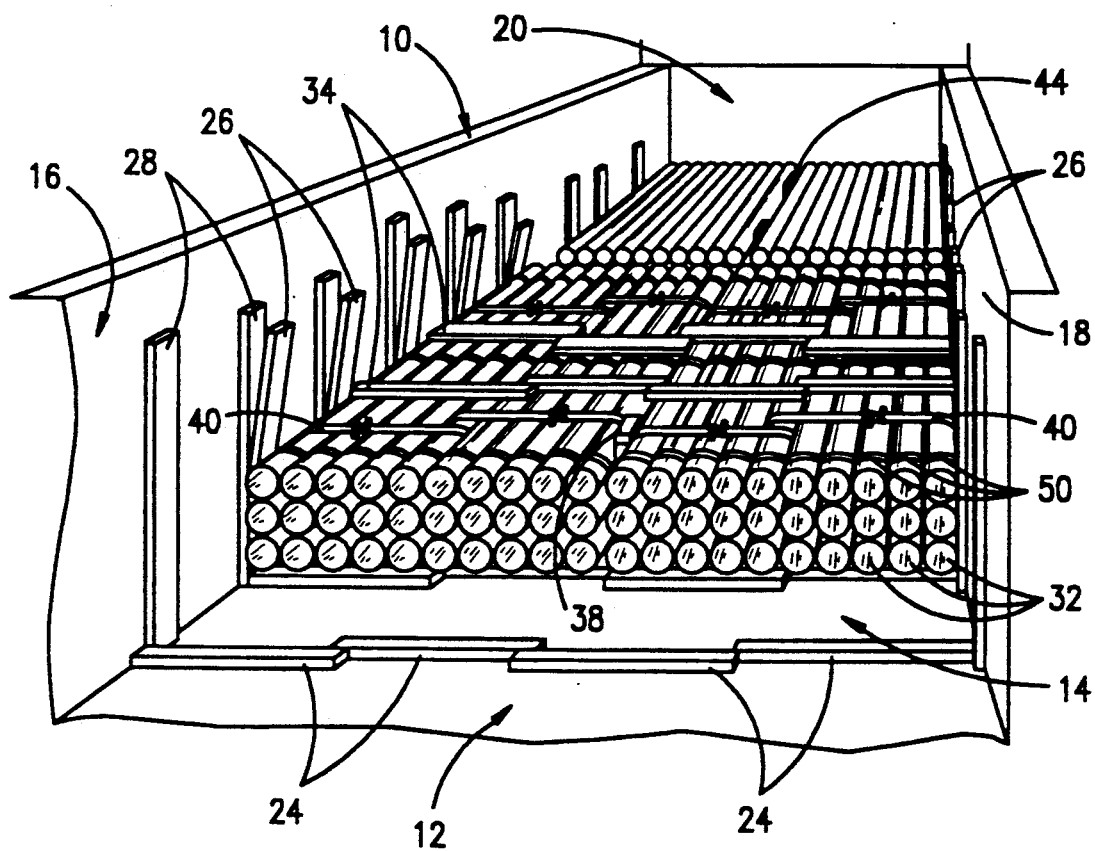
FIG. 1 is a perspective, partially cut away view of the hold of a ship, showing a partial load of pipe joints having been loaded according to the method of the invention.
Figure 2:
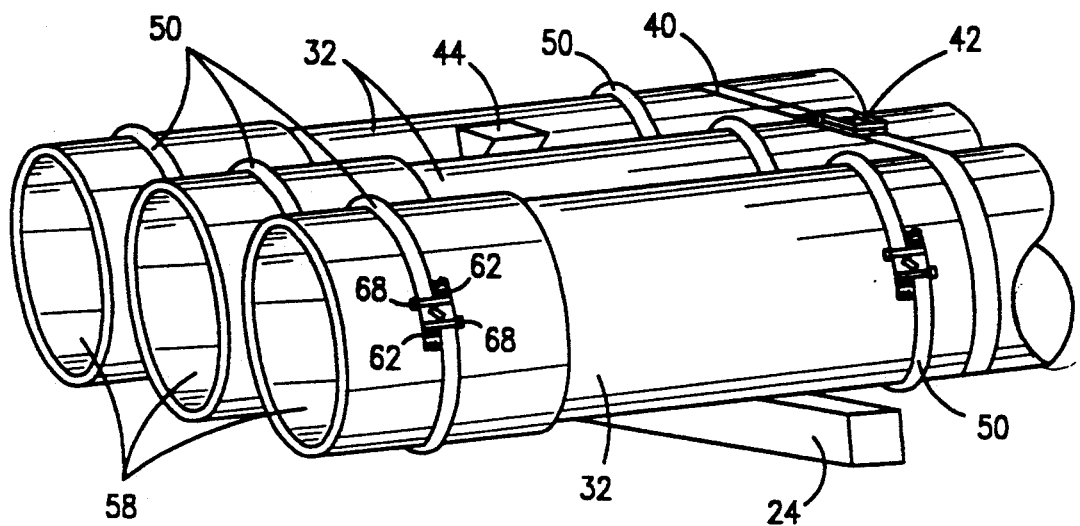
FIG. 2 is a perspective view of several pipe joints having been loaded into the hold of a ship, and illustrating the method of the invention.

As discussed above, it is an object of the invention to provide a method for loading the hold of a ship with a quantity of pipe joints so as to prevent the pipe joints from impacting one another, and also the steel hold of the ship, during an ocean voyage, thus preventing work hardening. An arrangement for stacking pipe joints according to the invention in a typical cargo vessel 10 is shown in FIG. 1. FIG. 2 is a more detailed view of the pipe joint stacking arrangement. As shown in FIG. 1, pipe joints 32 are loaded into a hold 12 defined by a deck 14, longitudinal bulkheads 16 and 18, and transverse end bulkheads, only one end bulkhead 20 being shown. As is conventional, wooden timbers 24, typically four by four inches in cross section, are placed at intervals along the deck. Similar timbers 26 are disposed at intervals along the longitudinal bulkheads 16 and 18. Wedge timbers 28 may be placed between bulkhead 16 and the timbers 26 to be contacted by the pipe joints. Pipe joints 32 are stacked in longitudinal rows, the lowest row resting directly on the timbers 24 on the deck 14. As each row of pipe joints 32 is completed, further timbers or planks 34 are placed transversely across the row, so that each row of pipe joints rests upon timbers 34. When a row has been completed, wooden spacers 38 may be interposed between two or more adjoining pipe joints 32 to occupy all horizontal space between the adjacent pipe joints 32 of the row, to prevent lateral rolling of the pipe joints 32 on the timbers 24.

The prior art also teaches prevention of lateral rolling of the pipe joints 32 by binding the pipe joints 32 into a tightly packed array, that is, by securing the pipe joints 32 to one another and also to the hold 12 of the ship by use of tension straps 40. The tension straps 40 may be employed to bind the pipe joints 32 tightly together before inserting spacers 38. Such straps 40 are supplied commercially together with ratchet take-up reels 42 for reeling up the strap 40 and applying tension thereto.

Preferably each strap 40 is a wide strap of a woven nylon material or the equivalent, which retains its elastic nature after elongation due to tension; accordingly, should the pipe joints settle during the voyage, the elastic straps 40 will take up any slack thus created, and will retain the pipe joints 32 in a tightly packed array. Use of straps 40 thus prevents space from developing between the pipe joints, which would allow the pipe joints to roll laterally, possibly building up a dangerous amount of momentum. It is also known to eliminate the space between adjacent pipe joints 32, particularly in the topmost layer thereof, by driving wooden wedges 44 between adjacent pipe joints 32.

As indicated above, the prior art has employed relatively heavy molded plastic bumper rings on each of a load of pipe joints. However such molded plastic bumper rings are not suitably durable to prevent damage to pipe joints during transport, particularly during ocean voyages. Moreover such molded plastic bumper rings tend to crack and fracture during voyages and may fall from the pipe joints under circumstances so as to endanger persons unloading the vessel.

According to the invention, such known molded plastic bumper rings are replaced by rings 50 fabricated of lengths of hemp rope assembled over the pipe joints 32. The rope rings 50 serve essentially similar functions as had the molded plastic bumper rings known to the prior art, but do so in a markedly improved fashion. More specifically, rope rings 50 fabricated of hemp rope according to the invention have been found by the inventor to be much more durable in service than molded plastic rings. As noted, the molded plastic bumper rings used in the prior art tended to crack, fracture, and shatter upon repeated impacts, e.g., between adjacent pipe joints in the hold of a ship during a rough passage. The rope rings 50 of the invention do not thus shatter. Accordingly, the rope rings 50 protect the pipe joints 32 more effectively than had the known molded plastic bumper rings, while eliminating the danger to stevedores and the like presented by falling fragments of fractured molded plastic bumper rings. Further, the tendency of the previously used molded plastic bumper rings to fracture or shatter rendered them essentially single-use devices; that is, so few molded plastic rings were reusable that it was not economical to ship the reusable plastic rings back to a port of origin for reuse. Accordingly even reusable molded plastic bumper rings have typically been discarded. By comparison, virtually all rope rings according to the invention can be reused in an economically feasible fashion. Moreover the initial cost of fabrication of the rope rings of the invention is substantially less than the purchase price of the molded plastic bumper rings used in the prior art.

Still further, the molded plastic bumper rings used to protect pipe joints in the prior art were each sized to fit a single specific size of pipe joint to be shipped. Accordingly, when a given number of pipe joints of several different sizes were to be shipped in a given load, it was essential to correctly calculate the number of different sizes of plastic bumper rings needed to adequately protect the various pipe joints during the voyage, so that the correct plastic bumper rings were on hand during the loading process. This obviously placed a constraint on the loading process; if the correct numbers of molded plastic bumper rings were not available the shipment would be delayed.

By comparison, according to the invention the rope rings 50 are fabricated prior to or simultaneously with the loading process by cutting suitable rope, preferably multiple strand hemp rope, to appropriate lengths, binding the cut ends of the lengths of ropes to prevent fraying, and securing the ends of the lengths of rope over the pipe joints to form rings. The rings are preferably formed in a manner detailed below. Suitable multiple strand hemp rope is a staple of shipping readily available at dockyards during ship loading. Conventional flexible plastic locking strips are used in fabrication of rope rings according to the invention. Such locking strips are similarly readily available in dockyards. According to the invention, rope rings may thus be fabricated over the pipe joints to be shipped during or just prior to the loading process, eliminating the possibility of delay of a particular shipment due to inability to obtain the proper molded plastic bumper rings at the appropriate time.

Figure 3:
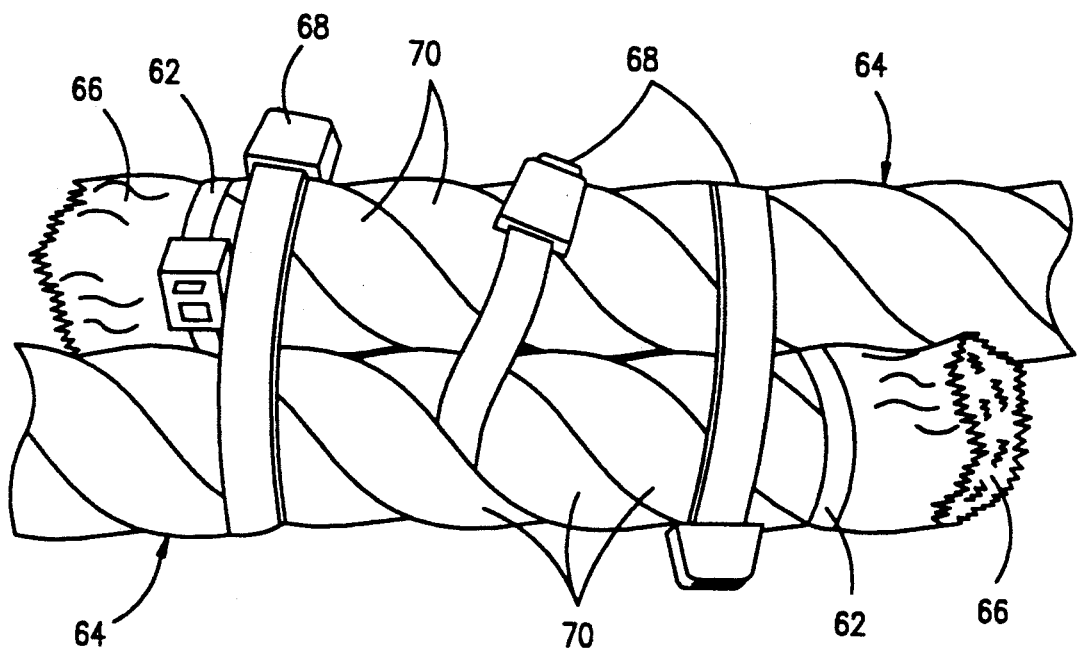
FIG. 3 is a close-up perspective view of the manner whereby the ends of a length of rope are bound to prevent fraying and are joined to one another about a pipe joint to form a protecting rope ring.

FIGS. 2 and 3 detail the manner in which lengths of rope may be manufactured into rope rings and used as protectors for pipe joints during shipping according to the invention. As indicated, the preferable rope material is stranded hemp rope; particularly in larger rope sizes, four-strand hemp rope is preferred over three-strand hemp rope, four-strand rope being generally less compressible than three-strand rope of the same diameter. The diameter of the rope employed may vary somewhat in accordance with the size of the pipe joints to be protected thereby; for example, excellent results have been obtained using three rope rings 50 fabricated of four-strand hemp rope 1¼ inch diameter to protect 9⅝ inch diameter pipe joints against impacts from one another during shipment.

In some cases portions of a particular pipe joint 32 to be protected by rope rings 50 may be of several different diameters. For example, internally threaded pipe couplings 58 (FIG. 2) are commonly preassembled over a threaded section at one end of each pipe joint 32 to expedite assembly of the pipe joints as a well casing. Similarly, end portions of pipe joints 32 (particularly in smaller sizes) may be "upset" in the manufacturing process to permit cutting of internal threads. In such cases it is desirable to employ rope rings 50 fabricated of rope of varying diameters to protect the different sections of the pipe joints, the diameter of the rope of each rope ring 50 being selected so that the overall diameters of all of the rope rings 50 on a particular pipe joint 32 are substantially equal.

FIGS. 2 and 3 illustrate typical rope rings 50 according to the invention fabricated of lengths of rope 64 using flexible plastic self-locking strips 62 and 68. In a preferred embodiment of the method of the invention, illustrated in FIG. 3, a first pair of relatively small flexible plastic locking strips 62 are used to bind the cut ends 66 of each length of rope 64 to prevent unraveling or fraying. Three flexible plastic locking strips 68, preferably of a relatively larger size, are then employed to secure the two ends 66 of the length of rope 64 to one another, forming a rope ring 50.

According to the preferred method of practice of the invention, each length of rope 64 is fabricated into a rope ring 50 over the pipe joint itself, as opposed to manufacture of the rope rings over a mandrel or the like for subsequent disposition over the pipe joints. While it is somewhat less convenient to fabricate the lengths 64 of rope into rope rings 50 over the pipe joints 32 rather than to prefabricate rope rings in a separate operation, a better result is thus achieved. More specifically, if lengths of rope 64 were prefabricated into rings 50 over a mandrel and subsequently placed over the pipe joints 32, the rope rings 50 would necessarily have to be of sufficient diameter to fit over any pipe couplings 58 or upset sections and slid along the pipe joint 32 to an appropriate location. Such prefabricated rope rings would be somewhat loose on the pipe joints 32 at their final locations, and could move along the pipe joints 32 during shipment, possibly failing to prevent the pipe joints 32 from impacting one another during a voyage. Therefore, in the best mode of practice of the invention, lengths of rope 64 are assembled into rope rings 50 over the pipe joints 32 during or just prior to the loading operation. Preferably the rope rings 50 are fabricated to fit relatively tightly around the pipe joints 32, reducing the chance that the rope rings 50 might move away from the appropriate locations.

Assembly of the lengths of rope 64 over the pipe joints 32 to fabricate rope rings 50 is best performed as a two man operation. Lengths of rope 64 are cut sufficiently long to wrap once around the circumference of a particular pipe joint 32 with a suitable overlap of the two cut ends 66. Typically seven inches' overlap is sufficient to secure the cut ends 66 of the rope to one another, forming a rope ring. The cut ends 66 may then each be bound by plastic locking strips 62 to prevent fraying or unraveling. The ends of the length of rope 64 may be bound otherwise, for example, by adhesive tape. One of the installers then untwists the rope ends sufficiently to allow the other to insert a first plastic locking strip 68 between the strands 70 of each of the cut ends 66 of the length of rope 64. Two additional locking strips 68 may then be placed over the two ends 66 of the length of rope 64. All three strips 68 are then tightened down, and their excess length cut off.

It will furthermore be understood by those of skill in the art that other arrangements of locking strips 68 to secure the two ends 66 of the length of rope 64 to one another are possible. For example, any one or more than one of the locking strips 68 may be threaded between the strands 70 of the rope 64. Preferably at least one locking strip 68 is thus threaded between the strands 70 of both ends 66 of the length of the rope 64, and is disposed at an angle to the axis of the rope as shown so that tightening that locking strip 68 tends to tighten the rope 64 around the pipe joint. The number of locking strips 68 can similarly be varied without departing from the principles of the present invention.

As will be well understood of those of skill in the art suitable plastic locking strips 62 and 68 typically comprise a box-like head having an internal ratchet arm on one end, and a tail on the other end; the tail is provided with molded teeth to allow only one-way motion of the tail through the box-like head. Accordingly, in assembly of the locking ties 62 and 68, the tail is pushed through the head and is prevented from moving in the opposite direction by the ratchet action of the locking arm on the teeth. Plastic locking strips suitable for practice of the invention are available readily from numerous sources. Such flexible plastic locking strips are available in a wide range of lengths and sizes, and it is well within the skill of the art to select suitable locking strips for practice of the methods of the invention.

It will be appreciated by those of skill in the art that under normal circumstances the rope rings can be reused. At the end of a first voyage, the locking strips 68 holding the two ends 66 of the length of rope 64 together may be cut, releasing the rope 64. The lengths of rope 64 may then be returned to the port of loading of the ship to be refabricated as rope rings 50 about a subsequent load of pipe joints.

According to the preferred mode of practice of the present invention, when rope more than one inch or more in diameter is used, four-strand hemp rope with a hemp center is preferred, as such four strand rope is less compressible than three strand rope of the same size. Rope less than one inch in diameter is used in three-strand configuration. Preservatives such as oil in the rope are optional. Rope at least 1¼ inch in diameter is used to protect pipe joints seven inches and larger in diameter. Three rope rings 50 are used to protect each typical pipe joint. As indicated above, where the possibility exists that pipe couplings 58 could impact one another, the pipe couplings 58 may be encircled by rope rings fabricated of rope of smaller diameter, so that the overall diameter of each of the rope rings over a given pipe joint is consistent.

Having described preferred and alternative embodiments of a new and improved method of preventing damage to pipe joints during shipment, it is believed that other modifications, variations and changes will be suggested to those skilled in the art in view of the teachings set forth herein. In particular, the invention has been described in connection with loading pipe joints directly into the hold of a ship. However, the method of the invention is also applicable to processes for stacking pipe joints in different shipping containers, such as discrete box-like containers that may be loaded with pipe joints and placed on a ship and may also be conveniently transported by rail or by truck. It is therefore to be understood that all such variations, modifications and changes are believed to fall within the scope of the present invention as defined by the appended claims.

What is claimed is:

1. Method of separating adjacent pipe joints from one another with rope rings during shipping, comprising the steps of:
   cutting rope into lengths longer than the circumference of the corresponding pipe joints;
   wrapping said lengths of rope around said pipe joints so that cut ends of each length of rope adjoin one another; and
   securing said adjoining cut ends of each said length of rope to one another over said pipe joints to form rope rings over said pipe joints, prior to placing said pipe joints in container means for shipment.

2. The method of claim 1, wherein said adjoining cut ends of each length of rope are secured to one another using flexible plastic locking strips.

3. The method of claim 1, comprising the further step of binding the cut ends of each length of rope prior to wrapping each length of rope around the corresponding pipe joint.

4. The method of claim 3, wherein said cut ends of each length of rope are bound using flexible plastic locking strips.

5. The method of claim 2, wherein said rope is multiply-stranded rope, and said method comprises the further steps of threading one or more of said flexible plastic locking strips between strands of said lengths of rope near their cut ends, and then joining ends of said locking strips to one another.

6. The method of claim 5, wherein said cut ends of each length of rope are bound using further flexible plastic locking strips prior to said step of threading.

7. The method of claim 1, wherein said pipe joints are placed in the hold of a ship in stacked layers, said hold having a deck and longitudinal and end bulkheads, and said method comprises the further step of interposing wood timbers between the lowermost layer of said pipe joints in said hold and the deck of said hold, between adjacent layers of said pipe joints, and between said pipe joints and the longitudinal bulkheads of said hold.

8. The method of claim 7, comprising the further step of securing each layer of said pipe joints against lateral rolling on said timbers.

9. The method of claim 8, wherein said step of securing is performed by inserting spacer means between adjacent pipe joints in a given layer.

10. The method of claim 8, wherein said step of securing is performed by employment of straps of an elastic material under tension to urge said pipe joints into a tightly-packed array.

11. The method of claim 8, wherein said step of securing is performed by inserting wooden wedges between adjacent pipe joints in a topmost layer thereof.

12. A method for loading a hold of a ship with pipe joints for transport, comprising the steps of:
 securing wooden timbers to a deck and to longitudinal bulkheads of said hold;
 disposing at least three continuous rings of hemp rope over each pipe joint to be loaded into said hold;
 stacking first and subsequent layers of said pipe joints on said timbers on the deck of said hold; and
 completing each layer before beginning to stack the next, by placing further wood timbers between each layer of pipe joints.

13. The method of claim 12, comprising the further step of inserting wooden wedges between the pipe joints of the topmost layer thereof, to secure said pipe joints against rolling.

14. The method of claim 12, wherein each said ring of rope is disposed over and secured to a corresponding pipe joint according to the following steps:
 cutting a length of rope longer than the circumference of the corresponding pipe joint;
 binding cut ends of said length of rope;
 placing said length of rope around the corresponding pipe joint, such that said bound ends of said length of rope lie adjacent one another on the surface of the corresponding pipe joint; and
 securing said adjacent ends of said length of rope to one another.

15. The method of claim 14, wherein one or more flexible plastic locking strips are employed in said step of securing said adjacent ends of said lengths of rope to one another.

16. The method of claim 15, wherein said length of rope comprises multiple strands, and said method comprises the further step of threading at least one of said flexible plastic locking strips between strands of said length of rope at each of said adjacent ends thereof prior to securing said adjacent ends of said length of rope to one another.

17. The method of claim 16, wherein said step of binding the cut ends of said length of rope is performed prior to said step of threading said plastic binding strips between the strands thereof.

18. The method of claim 17, wherein said step of binding the cut ends of the length of rope is performed by securing flexible plastic binding strips over the cut ends of the length of rope.

19. The method of claim 12, wherein end portions of at least some of said pipe joints have larger diameters than central portions thereof, and wherein said step of placing rings of rope therearound includes the step of selecting the diameter of the rope of each individual ring of rope with respect to the diameter of the portion of the pipe joint over which said individual ring will be disposed, so that the overall diameters of each of the rings of rope disposed over any given pipe joint are substantially equal.

20. The method of claim 12, wherein said step of completing each layer includes the step of securing the pipe joints of each layer against rolling laterally across said timbers.

21. The method of claim 20, wherein said pipe joints of each layer are secured to one another employing tension members to urge said pipe joints into a tightly packed array.

22. The method of claim 20, comprising the further step of inserting spacer members between the pipe joints of each layer, to substantially eliminate space therebetween.

* * * * *